United States Patent
Doi et al.

(10) Patent No.: US 7,409,267 B2
(45) Date of Patent: Aug. 5, 2008

(54) PREDICTIVE ROBOT, CONTROL METHOD FOR PREDICTIVE ROBOT, AND PREDICTIVE ROBOTIC SYSTEM

(75) Inventors: Miwako Doi, Kanagawa (JP); Shun Egusa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 786 days.

(21) Appl. No.: 10/978,459

(22) Filed: Nov. 2, 2004

(65) Prior Publication Data

US 2005/0149229 A1    Jul. 7, 2005

(30) Foreign Application Priority Data

Nov. 4, 2003    (JP) ............................. 2003-374830

(51) Int. Cl.
*G06F 19/00* (2006.01)

(52) U.S. Cl. .................... 700/245; 700/247; 700/248; 700/249; 700/256; 700/258; 700/259; 700/264; 318/568.11; 600/102; 600/130; 600/205; 901/1; 901/2; 901/9

(58) Field of Classification Search ................ 700/245, 700/247, 248, 249, 256, 258, 259, 264; 318/568.11; 600/102, 130, 205; 901/1, 2, 9
See application file for complete search history.

(56) References Cited

U.S. PATENT DOCUMENTS

| | | | | |
|---|---|---|---|---|
| 5,933,345 | A * | 8/1999 | Martin et al. .................. | 700/44 |
| 6,487,459 | B1 * | 11/2002 | Martin et al. .................. | 700/44 |
| 6,738,677 | B2 * | 5/2004 | Martin et al. .................. | 700/44 |
| 7,209,801 | B2 * | 4/2007 | Anfindsen et al. ........... | 700/245 |
| 7,236,854 | B2 * | 6/2007 | Pretlove et al. .............. | 700/246 |
| 2003/0078684 | A1 * | 4/2003 | Martin et al. .................. | 700/44 |
| 2007/0199108 | A1 * | 8/2007 | Angle et al. .................. | 901/17 |

FOREIGN PATENT DOCUMENTS

| | | |
|---|---|---|
| JP | 9-81099 | 3/1997 |
| JP | 2000-99441 | 4/2000 |
| JP | 2000-347970 | 12/2000 |
| JP | 2001-14052 | 1/2001 |
| JP | 2001-014052 | 1/2001 |
| JP | 2001-154692 | 6/2001 |

(Continued)

OTHER PUBLICATIONS

Dixon et al., Predictive robot programming, 2002, IEEE, p. 876-881.*

(Continued)

*Primary Examiner*—Khoi H. Tran
*Assistant Examiner*—McDieunel Marc
(74) *Attorney, Agent, or Firm*—Oblon, Spivak, McClelland, Maier & Neustadt, P.C.

(57) ABSTRACT

A predictive robot includes a prediction-related item storage to store terms related to prediction performance, a first communicator which transmits stored prediction-related terms and receives a search result of information search with regard to the prediction-related terms, a search controller to control information search of the prediction-related terms stored in the prediction-related item storage via the first communicator, a media converter to convert the search result into a notification medium, and a notification section to provide the search result by the notification medium. Preferably, predictive information is provided spontaneously.

14 Claims, 9 Drawing Sheets

FOREIGN PATENT DOCUMENTS

| | | |
|---|---|---|
| JP | 2002-297587 | 10/2002 |
| JP | 2003-150608 | 5/2003 |
| JP | 2003-178261 | 6/2003 |
| JP | 2003-216862 | 7/2003 |
| JP | 2003-219391 | 7/2003 |
| JP | 2003-271169 | 9/2003 |

OTHER PUBLICATIONS

Berlin et al., Robust predictive robot control, 1991, IEEE, p. 1493-1496.*

Kazuhiro Fukui, et al., "Facial Feature Point Extraction Method Based on Combination of Shape Extraction and Pattern Matching", IEICE D-II, vol. J80-D-II, No. 8, p. 2170-2177, Aug. 1997.

* cited by examiner

FIG. 2

| CATEGORY | BASIC | | WEATHER | | TRAFFIC | | EVENT | | ... |
|---|---|---|---|---|---|---|---|---|---|
| PREDICTION CYCLE | | | ONCE/HOUR | | ONCE/HOUR | | ONCE/DAY | | ... |
| PREDICTION NOTIFICATION LEVEL | | | AA | | AAA | | A | | ... |
| PREDICTION-RELATED TERM AND PARAMETER | LOCATION OF HOME | LATITUDE: 35 DEGREES, 32 MINUTES, 16 SECONDS N; LONGITUDE: 139 DEGREES, 41 MINUTES, 24 SECONDS E | BASIC URL 1 | http://weather.yahoo.co.jp/weather/jp/14/4132/46106.html | BASIC URL 1 | http://ekitan.com | BASIC URL 1 | http://xxxx | |
| | LOCATION OF OFFICE 1 | LATITUDE: XX°N, LONGITUDE: YY°E | RAINFALL PROBABILITY | ≥ 20% | DELAY 1 | ≥ 10 MIN. & JR NANBU LINE | BASIC URL 2 | http://xxxx | |
| | NAME OF COMPANY | TOSHIBA | RAINFALL PROBABILITY | ≥ 10(mm/h) | DELAY 2 | ≥ 10 MIN. & TOKYU DENEN-TOSHI LINE | BASE POINT 1 | JR KAWASAKI STA. | |
| | FAMILY MEMBER 1 | TARO | WIND DIRECTION AND WIND SPEED | ≥ 9(m/s) | LOCATION OF FAMILY MEMBER 1 | DISTANCE (LOCATION OF FAMILY MEMBER) - (LOCATION OF HOME) ≤ 500m | BASE POINT 2 | NISHI-MAGOME STA., TEITO RAPID TRANSIT AUTHORITY (TRTA) ASAKUSA LINE | |
| | FAMILY MEMBER 2 | HANAKO | TYPHOON | PREDICTION CYCLE IS TO BE SHORTENED WHEN TYPHOON IS APPROACHING THE KANTO AREA | | | COMMUNITY FESTIVAL | NA | |
| | .. | .. | TYPHOON | PREDICTION CYCLE IS TO BE RETURNED WHEN TYPHOON HAS PASSED | .. | .. | .. | .. | |
| | .. | .. | HAIL | NA | .. | .. | .. | .. | |
| | .. | .. | .. | .. | .. | .. | .. | .. | |
| | .. | .. | | | | | | | |

FIG. 4A
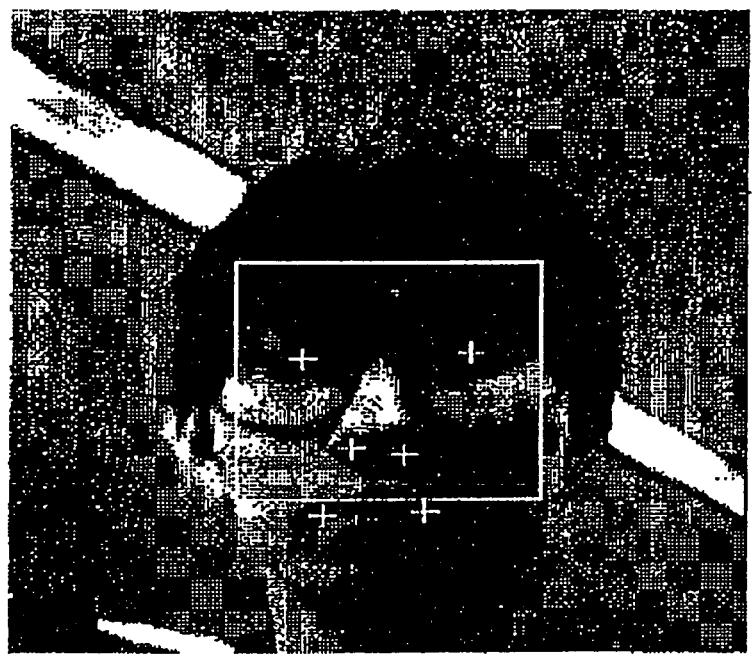
FIG. 4B    FIG. 4C    FIG. 4D
    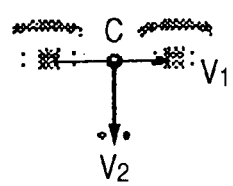    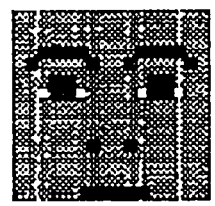

FIG. 6

| CATEGORY OF PREDICTION | NAME USED IN PREDICTION | PRIMARY CONTENT | ADDITIONAL CONTENT |
|---|---|---|---|
| WEATHER | (NAME OF FAMILY MEMBER) | (PREDICTION-RELATED TERM) IS (PARAMETER HIT IN SEARCH) | IS THE LAUNDRY OK? |
| TRAFFIC | (NAME OF FAMILY MEMBER) | (PREDICTION-RELATED TERM) IS DELAYED BECAUSE OF (PARAMETER HIT IN SEARCH) | IF (IT IS MORNING), THEN YOU'D BETTER LEAVE HOME EARLY |
| TRAFFIC | (NAME OF FAMILY MEMBER) | (PREDICTION-RELATED TERM) IS DELAYED BECAUSE OF (PARAMETER HIT IN SEARCH) | IF (IT IS EVENING), THEN YOUR RETURN WILL BE LATER THAN USUAL |
| EVENT | (NAME OF FAMILY MEMBER) | (PREDICTION-RELATED TERM) IS (A PARAMETER HIT IN SEARCH) | THE EVENT IS TO OCCUR IN THE NEIGHBORHOOD, AND SOUNDS EXCITING |
| .. | .. | .. | .. |

FIG. 9

| CATEGORY | BASIC | | WEATHER | | TRAFFIC | | EVENT | | SPORTS | | |
|---|---|---|---|---|---|---|---|---|---|---|---|
| PREDICTION CYCLE | | | ONCE/HOUR | | ONCE/HOUR | | ONCE/DAY | | ONCE/DAY | | ... |
| PREDICTION NOTIFICATION LEVEL | | | AA | | AAA | | A | | A | | ... |
| PREDICTION-RELATED TERM AND PARAMETER | LOCATION OF HOME | LATITUDE: 35 DEGREES, 32 MINUTES, 16 SECONDS N; LONGITUDE: 139 DEGREES, 41 MINUTES, 24 SECONDS E | BASIC URL 1 | http://weather.yahoo.co.jp/weather/jp/14/14132/46106.html | BASIC URL 1 | http://ekitan.com | BASIC URL 1 | http://xxxx | SOCCER | http:// xxxx | ... |
| | LOCATION OF OFFICE 1 | LATITUDE: XX°N; LONGITUDE: YY°E | RAINFALL PROBABILITY | ≥ 20% | DELAY 1 | ≥ 10 MIN. & JR NANBU LINE | BASIC URL 2 | http://xxxx | BECKHAM | http:// xxxx | ... |
| | NAME OF COMPANY | TOSHIBA | RAINFALL PROBABILITY | ≥ 10 (mm/h) | DELAY 2 | ≥ 10 MIN. & TOKYU DENEN-TOSHI LINE | BASE POINT 1 | JR KAWASAKI STA. | WORLD CUP | http://yyy | |
| | FAMILY MEMBER 1 | TARO | WIND DIRECTION AND WIND SPEED | ≥ 9 (m/s) | LOCATION OF FAMILY MEMBER 1 | DISTANCE [(LOCATION OF FAMILY MEMBER)-(LOCATION OF HOME)] ≤ 500(m) | BASE POINT 2 | NISHI-MAGOME STA., TRTA ASAKUSA LINE | | | |
| | FAMILY MEMBER 2 | HANAKO | TYPHOON | PREDICTION CYCLE IS TO BE SHORTENED WHEN A TYPHOON IS APPROACHING THE KANTO AREA | | | COMMUNITY FESTIVAL | NA | | .. | |
| | .. | .. | TYPHOON | PREDICTION CYCLE IS TO BE RETURNED WHEN TYPHOON HAS PASSED | .. | | .. | | .. | | ... |
| | ... | ... | HAIL | NA | ... | | ... | | ... | | ... |
| | .. | .. | .. | | .. | | .. | | .. | .. | ... |

PREDICTIVE ROBOT, CONTROL METHOD FOR PREDICTIVE ROBOT, AND PREDICTIVE ROBOTIC SYSTEM

CROSS REFERENCE TO RELATED APPLICATIONS

This application is based upon and claims the benefit of priority from the prior Japanese Patent Application No. 2003-374830, filed Nov. 4, 2003, the entire contents of which are incorporated herein by reference.

BACKGROUND OF THE INVENTION

1. Field of the Invention

The present invention relates to a predictive robot which provides predictive information through acquisition of prediction terms from information contained in a user's conscious marking activities, such as video recording or selection of TV programs, without awareness on the part of the user. A feature of the invention is that the prediction terms are acquired through natural operation as a part of communication, such as starting a dialog mode or replacement of a fuel cell cartridge.

2. Description of the Related Art

A variety of robots have been developed, including bipedal walking robots, entertainment robots that resemble animals, multilingual robots, house-sitting robots, and personal authentication robots making use of voice recognition and facial images.

These robots execute actions in response to voice commands from a person. More specifically, each of the above-listed robots executes actions, which have been previously performed in accordance with pre-programmed commands with use of a remote controller or a PC, by the user talking to the robot and voice recognition. Methods of determining whether or not the user has talked to the robot include a method of detecting a sound which does not continue for a specific length of time (e.g., hand clapping) (see, e.g., JP2001-154692 (kokai) ([0070], FIG. 7)).

However, in practical daily living, a user would like to be provided with local information before becoming aware of it by other means, such as information that the laundry needs to be taken in because the weather has suddenly become cloudy and rain seems imminent, or information that a meal needs to be prepared because a family member is on the way home from a train or bus station, in a predictive manner rather than by the user issuing commands.

Such provision of predictive information constitutes information provision of push-type rather than information provision of pull-type, such as conventional information retrieval by use of the Internet. In many cases, such push-type information is provided in the form of e-mail delivered to a PC or a cell phone. In robots of the related art, e-mail is vocally read in response to a command issued by an owner user of the robot.

Some robots connect themselves to a network and provide information upon acceptance of a query from a user about weather, or the like, however, such robots provide information in response to predetermined keywords or keywords supplied by the user. Accordingly, content of provided information lacks variety, which poses a problem. To this end, there is a service such that, a user who has purchased goods via Internet shopping is provided with information on the nature of other goods purchased by other users who have purchased the same goods (recommendation engine).

However, the above-mentioned services are provided on the basis of a person's intended action, and cannot cope with a problem of the inability to provide information without prompting by the user, such as information that, the laundry needs to be taken in because an atmospheric low-pressure system is approaching and is likely to bring rain.

Meanwhile, some TV programs display uniform resource locators (URLs) of, for instance, an advertisement or a homepage related to an on-air program. To access the advertisement or homepage, a viewer must write down the URL and directly input the same to a browser. Alternatively, a URL is electronically provided by an electronic program guide (EPG) which is provided in conjunction with digitization of TV broadcasting. However, the URLs are provided solely on a per-program basis. Storage of a link to URLs of athletes or actors/actresses who appear in broadcast programs or periodic acquisition of new information cannot be carried out.

As described above, there has not been developed a robot which voluntarily provides push-type information, such as a weather forecast, notification that a family member is on the way home, or information reported as a news flash, e.g., information about an earthquake, or information about traffic congestion due to a train accident. Accordingly, there are many situations such that laundry has already become wet with rain by the time a user notices that it is raining. To this end, demand exists for a framework which allows a robot to spontaneously provide information obtained through the network, such as a change in the weather or the imminent arrival of a family member. Furthermore, there are required measures for acquiring prediction terms for use in spontaneous provision of predictive information without invoking the user's awareness.

SUMMARY OF THE INVENTION

The present invention has been conceived in view of the above circumstances and provides a predictive robot which provides predictive information without the user's prior awareness.

According to an aspect of the present invention, a predictive robot includes a prediction-related item storage to store terms related to prediction performance, a first communicator which transmits stored prediction-related terms and receives a search result of information search with regard to the prediction-related terms, a search controller to control information search of the prediction-related terms stored in the prediction-related item storage via the first communicator, a media converter to convert the search result into a notification medium, and a notification section to provide the search result by the notification medium. Preferably, predictive information is provided spontaneously.

According to another aspect of the present invention, a predictive robot includes a prediction-related item storage to store terms related to prediction performance, a first communicator which transmits stored prediction-related terms and receives a search result of information search with regard to the prediction-related terms, a search controller to control information search of the prediction-related terms stored in the prediction-related item storage via the first communicator, a dialog generator to generate a predictive content by comparison of the search result with past search results, a media converter to convert the predictive content into a notification medium, and a notification section to provide the search result by the notification medium. Preferably, predictive information is provided spontaneously.

According to yet another aspect of the present invention, a control method for predictive robot includes transmitting a prediction-related term from a prediction-related item storage which stores terms related to prediction performance by way of a first communicator, receiving a search result of information search of the prediction-related term performed by the first communicator, controlling information search of the prediction-related term stored in the prediction-related item storage by way of the first communicator, converting the search result into a notification medium, and providing spontaneously predictive information by the notification medium.

According to yet another aspect of the present invention, a predictive robot system includes a predictive robot which has a prediction-related item storage to store terms related to prediction performance, a first communicator which transmits stored prediction-related terms and receives a search result of information search with regard to the prediction-related terms, a search controller to control information search of the prediction-related terms stored in the prediction-related item storage via the first communicator, a media converter to convert the search result into a notification medium, and a notification section to provide the search result by the notification medium, and a service provider which has a search section to perform information retrieval of the prediction-related term, a search result storage to store a search result retrieved by the search section, and a second communicator to receive the prediction-related term and transmit the search result of information search with regard to the prediction-related term. Preferably, predictive information is provided spontaneously.

According to the present invention, predictive information can be provided without a user being aware of predictive terms for use in spontaneous provision of the predictive information. Therefore, a user can be provided with a variety of predictive information without feeling annoyance.

BRIEF DESCRIPTION OF THE DRAWINGS

FIG. 2 shows an example of prediction-related terms stored in a prediction-related storage section;

FIGS. 4A to 4D are views for describing facial detection in a robot;

FIG. 6 is a view showing a template for notification of a prediction search result;

FIG. 9 shows an example of prediction-related terms stored in a prediction-related storage section of the second embodiment of the invention.

DETAILED DESCRIPTION OF THE INVENTION

Embodiments of the present invention will be described by reference to the drawings.

The embodiments of the invention relate to a predictive robot which provides predictive information by acquisition of prediction terms from information contained in user's unconscious marking activities, such as video recording or selection of programs.

Figure 1:
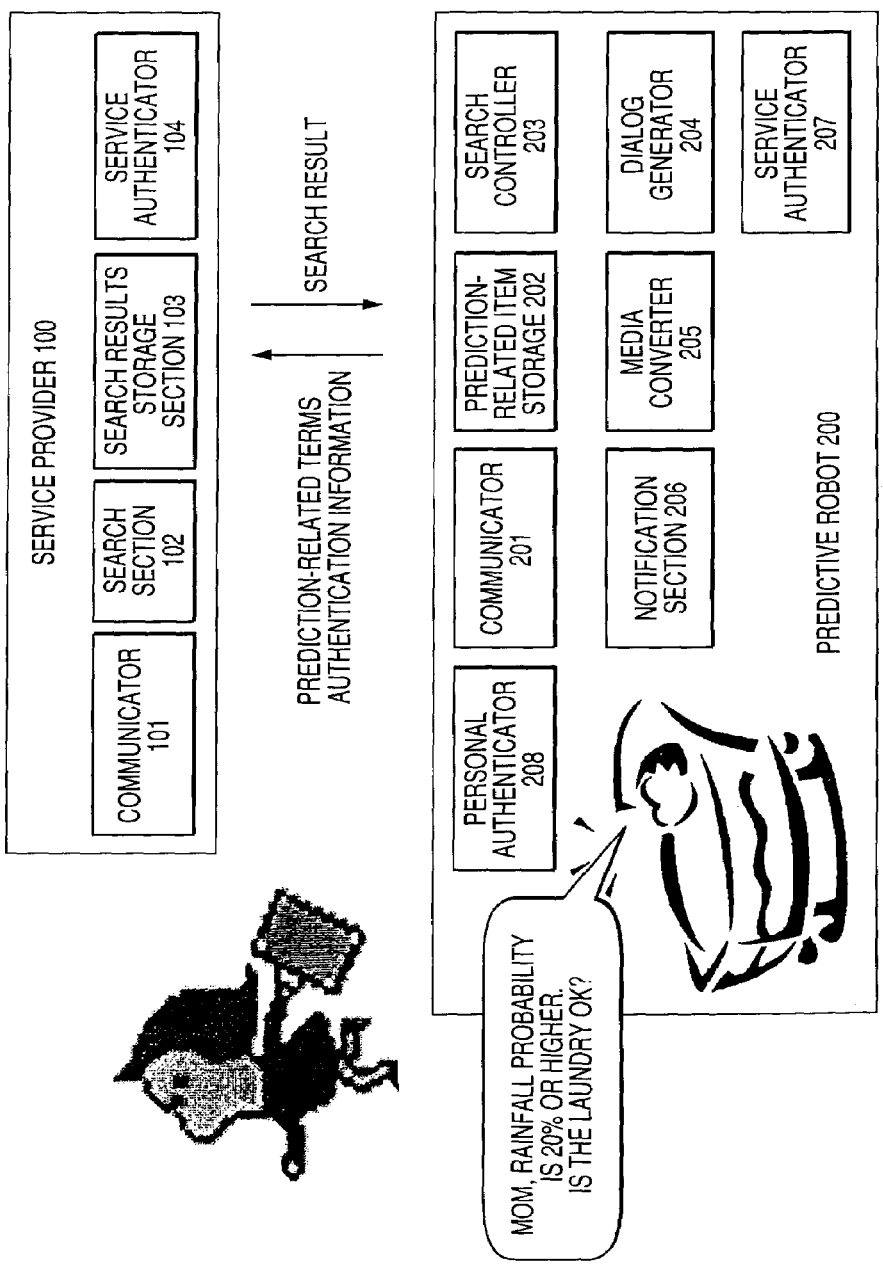
FIG. 1 is a schematic configuration diagram of a first embodiment of the present invention.

FIG. 1 shows a schematic diagram of a first embodiment of the invention, which is constituted of a predictive robot 200, and a service provider (or a home server) 100 for performing information search.

The service provider 100 includes a radio section 101, such as a wireless LAN, Bluetooth™, or IrDA, which conducts communication with the predictive robot 200, a search section 102 which retrieves information from another service provider, such as a service provider on the Internet or a weather forecasting server, a search results storage section 103 which stores search results for each predictive robot, and a service authenticator 104 which determines whether or not authentication information transmitted via the radio section 101 is correct.

The predictive robot 200 is constituted of a radio section 201, a prediction-related item storage 202, a search controller 203, a dialog generator 204, a media converter 205, a notification section 206, a service authenticator 207, and a personal authenticator 208. The radio section 201 is constituted of, for instance, a wireless LAN, Bluetooth™, or IrDA, for transmission of prediction-related terms and/or authentication information. The prediction-related item storage 202 stores terms related to prediction performance, such as weather forecast, train accident, or locations of family members. The search controller 203 controls, for example, transmission of a content of the prediction-related item storage 202 to the service provider 100 via the communicator 201, execution of periodic retrieval by the search section 102, and read-out of search results from the search results storage section 103 of the service provider 100. The dialog generator 204 generates predictive content by comparing the search result—which has been read-out from the search results storage section 103 by the search controller 203—chronologically or with search results obtained in the past, such as those obtained the previous day. The media converter 205 converts the predictive content generated by the dialog generator 204 into sound, an image, or a gesture, such as head shaking or hand waving. The notification section 206 is constituted of notification units, such as voice synthesizer, a display, and/or actuators of the robot, for providing a conversion result by the media converter 205. The service authenticator 207 determines whether or not the authentication information is correct. The personal authenticator 208 performs personal authentication for determining whether or not the person is the family member, on the basis of face recognition or the like.

Authentication methods that can be adopted for personal authentication in the personal authenticator 208 include, for instance, a method making use of a facial image captured by a camera, a method making use of an iris pattern captured by a camera, voice recognition, or fingerprint recognition. Hereinafter, the embodiment will be described in connection with a personal authentication method making use of a facial image, however, the personal authentication method is not limited thereto.

FIG. 2 shows an example of prediction-related terms stored in the prediction-related item storage 202. For instance, the prediction-related terms fall in categories such as "weather," "traffic," and "event" for providing predictive information. Prediction-related terms and corresponding parameters are listed for the respective categories.

Under the category "basic," there are stored prediction-related terms which are common for all the categories, such as the location of the user's home, or the locations of the offices where family members work. For each category, there is stored frequency of prediction search (hereinafter, referred to as "prediction cycle"), or a level of information notification upon occurrence of a predictive content (hereinafter, referred to as "prediction notification level"). The prediction cycle of "weather" or "traffic" is once an hour. Accordingly, the robot performs search with use of the prediction-related term at least once per hour, and updates predictive information. In contrast, the prediction cycle of "event" is once a day, and is lower than that of "weather" or "traffic." In the above description, the prediction cycle is set to once/hour or once/day, however, the cycle can be set so as to be more frequent, such as once/10 min. For instance, in a parameter of a prediction-related term of "typhoon," which falls under the category of "weather," the parameter is set such that "prediction cycle is to be shortened when a typhoon is approaching the Kanto area." This means that when predictive information such as "a typhoon is approaching Kanto area" is hit, the prediction cycle is to be shortened from once/hour to once/10 min. Meanwhile, when predictive information such as "the typhoon has passed" is hit, the prediction cycle is returned to the original once/hour on the basis of another predictive information parameter of "when a typhoon passes, prediction cycle is to be returned to its nominal value".

The prediction notification level indicates the timing for providing updated information. In the case of "traffic," having a prediction notification level of AAA, when a term registered as a prediction-related term is hit, the target family member is located, whereby information is provided to him/her. More specifically, in a case where the family member is at home and an information notification device or the predictive robot is mobile, the device or robot moves by itself, whereby the predictive information is provided, and when family members are out, the hit predictive information is provided to a cell phone or the like.

Meanwhile, in the case of "weather," having a prediction notification level of AA, when a term registered as a prediction-related term is hit, a family member is located so long as he/she is at home, whereby information is provided to him/her. More specifically, in a case where the family member is at home and an information notification device or the predictive robot is mobile, the device or robot moves by itself, whereby the predictive robot provides the predictive information. In the case of "event," having a prediction notification level of A, the information is provided to the predictive robot. Incases other than the above, the prediction notification level is classified such that the predictive information is provided to the predictive robot in accordance with a predetermined schedule, such as "when a user arrives home," or "at bedtime."

The prediction-related terms falling under the category "basic" are not for retrieval of predictive information which is hit in relation to the prediction-related terms, but for combination with a prediction-related term in another category, to thereby subjected to retrieval for predictive information. Therefore, the prediction notification level, or the like, is not indicated therein.

In the storage example shown in FIG. 2, for instance, URLs which are to be used for basic search are indicate as keywords for the corresponding categories. Under the category of "weather," there is stored a URL which issues a pinpoint weather forecast for the area that is closest to the target house.

The basic URL is not limited to one for each category as shown in the illustrated example of FIG. 2, and, as is the case for the category of "event," a category can have a plurality of basic URLs.

Figure 3:
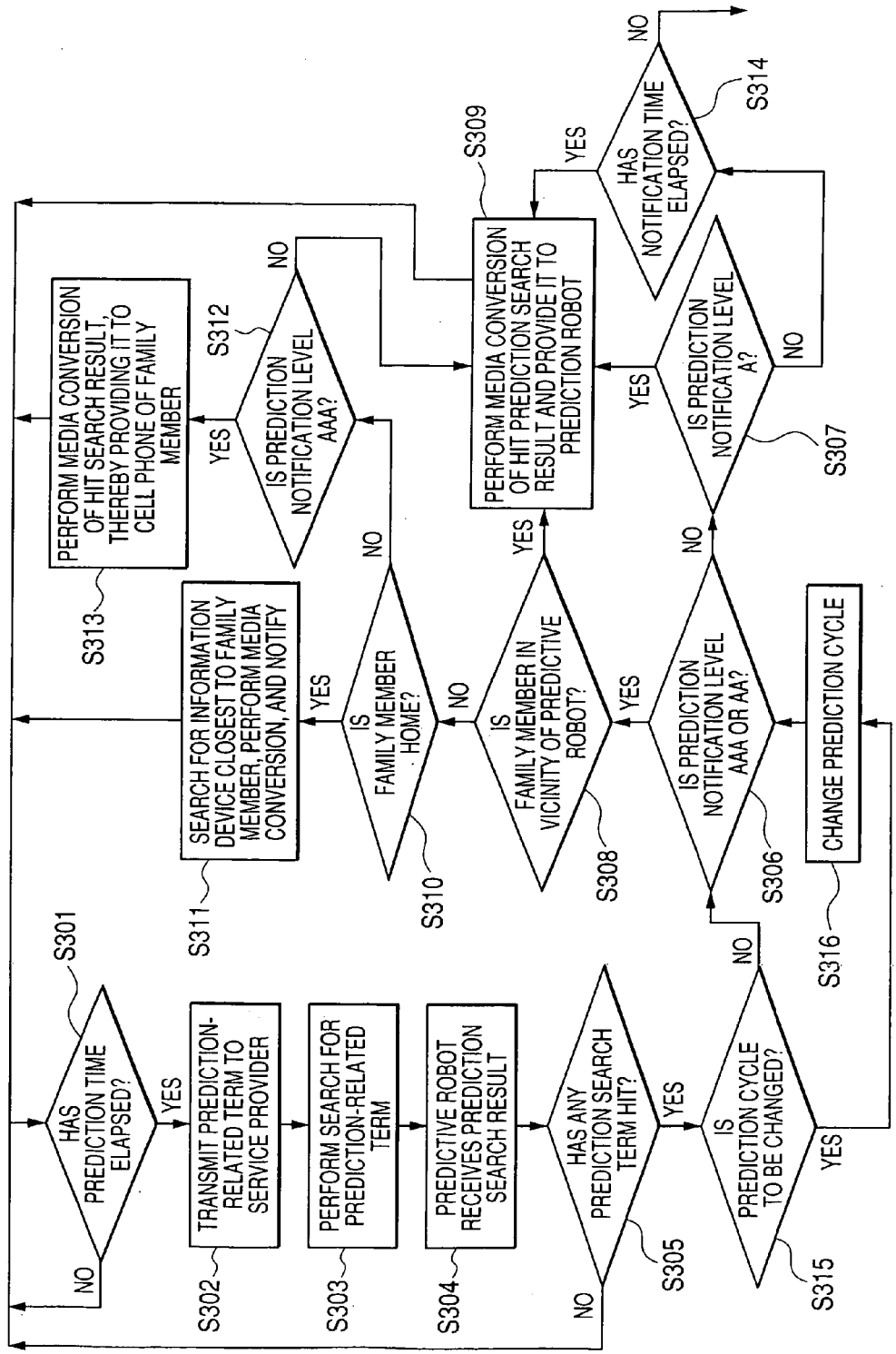
FIG. 3 is a flowchart showing a process of predictive information notification in a predictive robot.

FIG. 3 is a flowchart showing a flow of predictive information provision processing to be performed in the predictive robot. The predictive information is provided, for instance, in accordance with the prediction cycle shown in FIG. 2. With the elapse of a set prediction time (step S301), the search controller 203 of the predictive robot transmits the prediction-related term—which is stored in the prediction-related term storage section 202 in the form shown, e.g., in FIG. 2, and to which an authentication code is attached—to the service provider 100 via the communicator 201 (step S302).

The service provider 100 receives the transmission from the predictive robot 200 via the communicator 101. The service authenticator 104 determines whether or not the authentication code from the predictive robot 200 is correct. When the authentication code is authenticated, the search section 102 performs retrieval (step S303). The search result is stored in the search results storage section 103 as necessary. When the retrieval is finished, the search result, to which an authentication code is attached, is transmitted to the predictive robot 200 via the communicator 101.

The predictive robot 200 receives the transmission result via the communicator 201 (step S304). The service authenticator 207 determines whether or not the authentication code from the service provider 100 is correct. When the authentication code is authenticated, a check is made as to whether or not a parameter with regard to the received prediction-related term is hit in accordance with parameters stored in the prediction-related term storage section 202 (step S305).

The other prediction-related terms, such as "rainfall probability" or "amount of precipitation," are retrieved from the basic URL, and predictive information is provided on the basis of values corresponding thereto. The retrieved values are determined on the basis of parameters stored in the table shown in FIG. 2. For instance, when a weather forecast specifying "amount of precipitation: 10 mm or more" is searched in the basic URL, "10 mm or more" matches the parameter "≧10 mm or more", this means that the prediction search registers a hit.

A check is made as to whether or not the thus-hit prediction-related term includes a parameter of changing the prediction cycle, as is the case of the parameter of "typhoon" under the category of "weather" (step S315). When a parameter which changes the prediction cycle is included, the prediction cycle is changed (step S315). Accordingly, for instance, when predictive information such as "a typhoon is approaching Kanto area" is hit, the prediction cycle can be shortened from once/hour to once/10 min. Meanwhile, when predictive information such as "the typhoon has passed" is hit, the prediction cycle can be returned to the original once/hour on the basis of another predictive information parameter of "when typhoon passes, prediction cycle is to be returned to the nominal value."

In the case where the prediction cycle is not to be changed, or after the prediction cycle has been changed, in step S306 a check is made as to whether or not the prediction notification level is AAA or AA. In the case of the category of "weather," "traffic, " or the like, where immediate prediction is required, the predictive robot 200 checks whether or not a family member is in the vicinity of protective robot 200, by the personal authenticator 208.

The check of whether or not the family member is in the vicinity of protective robot 200 is made as follows.

First, the processing begins with detection of a moving body by a camera, or the like, which is disposed in the personal authenticator 208. The camera in the personal authenticator 208 is for the purpose of inputting facial images, and is constituted of a CCD camera, an illumination equipment, or the like. An image captured by a CCD or a CMOS camera is digitized by an A/D converter, such as an image input board, and the thus-digitized image is stored in an image memory. The image memory may be disposed on the image input board, or may be a memory of a computer.

Subsequently, a facial image is detected for the purpose of distinguishing the detected moving body. Extraction of a facial region is performed by detecting a region of a face or a head from an image stored in the image memory of the personal authenticator 208.

Several facial region extraction methods are available. For instance, in the case where the captured image is a color image, a method of using color information can be employed. More specifically, the color image is converted from a red-green-blue (RGB) color space into a hue-saturation-value (HSV) color space, and the facial region or a head hair region is subjected to region segmentation with use of color information, such as color tone or saturation. The thus-segmented partial regions are detected by a region growing method, or the like. There may be adopted another facial region extraction method, where in a template for facial detection, which has been prepared in advance, is moved in an image to obtain correlation values, whereby a region having the highest correlation value is detected as a facial region. There may be adopted still another method, wherein distances or similarities are calculated by use of an Eigenface method or a subspace method in lieu of the correlation values, thereby extracting a region of the minimum distance or maximum similarity. There may be adopted yet another method, wherein, in addition to the normal CCD camera, near infrared rays are projected onto a target, thereby extracting a region corresponding to a face of the target on the basis of the reflected light. The embodiment is not limited to the above-mentioned methods, and other methods may be adopted.

In lieu of the above, there may be adopted a method wherein positions of eyes are detected from the thus-extracted facial image, whereby a determination is made as to whether or not the object is a face, a method which utilizes pattern matching, as is the case in the facial detection, or a method of extracting facial feature points, such as eyes, nasal cavities, and mouth edges from dynamic picture images (see, e.g., Facial Feature Point Extraction by Combination of Shape Extraction and Pattern Matching", IEICE Journal, Vol. J80-D-II, No. 8, pp. 2170-2177 (1997)). Here again, an arbitrary one of the above-mentioned methods or another method may be adopted.

On the basis of the extracted facial region and facial components detected in the facial region, a region of predetermined size and shape is clipped out from the positions of the thus-detected facial components and those of the facial region. Density information of the clipped image is extracted from the input image as a feature amount for use in recognition. Two facial components are selected from the detected facial components. So long as a line segment which connects the two components falls within a range of the extracted facial region at a predetermined ratio, the facial region is converted into a region of m×n pixels, whereby a normalization pattern is obtained.

FIGS. 4A to 4D show an example where two eyes are selected as the facial components. FIG. 4A shows a facial region—which has been captured by image input units—in which an extracted facial region is indicated by a white rectangle, and detected facial components are indicated by white crosses superposed thereon. FIG. 4B is a schematic view of the extracted facial region and facial components. As shown in FIG. 4C, when ratios of the distance between the center of a line segment connecting the right and left eyes to the distances between respective components fall within predetermined ranges, the facial region is converted into density information. Thereby, density pixel matrix information of m×n pixels, as shown in FIG. 4D, is obtained. Hereinafter, a pattern as shown in FIG. 4D will be referred to as a normalization pattern. When a normalization pattern such as that shown in FIG. 4D is clipped, detection of at least a face from the image is assumed.

Figure 5A:
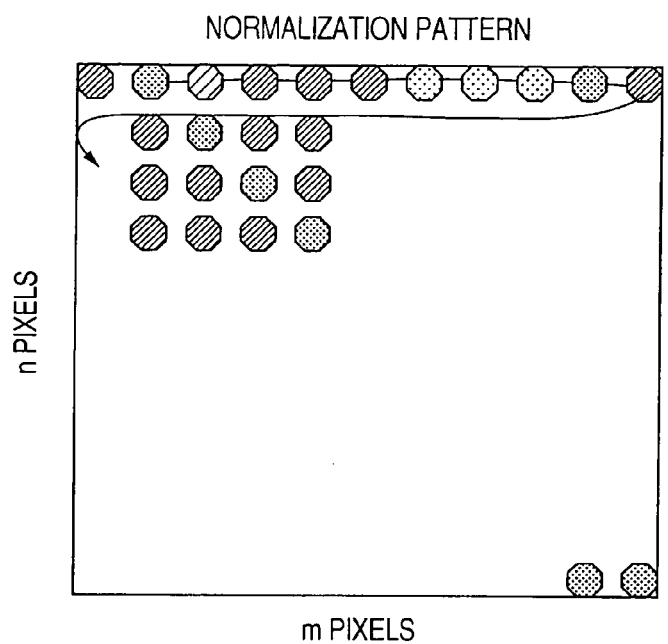
FIGS. 5A and 5B are views for describing a normalization pattern and feature vector of a facial image.
Figure 5B:
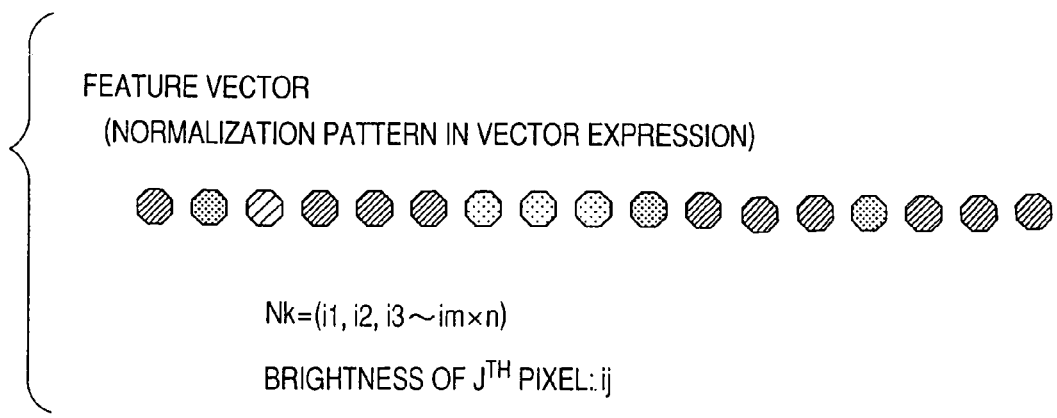

When clipping of the normalization pattern shown in FIGS. 4A to 4D is completed, authentication with regard to whether or not the clipped image is of a family member is performed. The authentication is performed as follows. In the normalization pattern shown in FIG. 4D, the density values are arranged in a matrix of m lines×n rows as shown in FIG. 5A. FIG. 5B shows the matrix converted into vector expression. The feature vector Nk ("k" indicates the number of the normalization pattern among normalization patterns obtained from one specified person) is utilized in the following calculations.

A feature amount for use in recognition is a subspace obtained by lowering the number of data dimensions of an orthonormal vector, which is obtained by calculating a correlation matrix of the feature vector and a K-L expansion of the matrix. The correlation matrix C is given by the following equation.

$$C = \frac{1}{r}\sum_{k=1}^{r} N_k N_k^T \qquad \text{[Formula 1]}$$

Where, "r" is the number of normalization patterns obtained from one specified person. Principal components (eigenvectors) are obtained by diagonalizing the correlation matrix C. M eigenvectors out of the eigenvectors arranged in descending order in terms of eigenvalue are used as a subspace. The subspace corresponds to a dictionary for performing personal authentication.

In order to perform personal authentication, the feature amount—which has been extracted in advance—must be registered in the dictionary, along with index information, such as the ID number of the target person, subspace (the eigenvalues, the eigenvectors, the number of dimensions, the number of sample data), and the like.

The personal authenticator 208 compares the feature amount registered in the dictionary and that extracted from the captured facial image, thereby performing identification. The identification is performed in accordance with similarity. Similarity is defined by distances and angles in an M-dimensional subspace constructed on the basis of the feature amount. The smaller the distance or the angle, the higher the similarity, and when a predetermined threshold is met, the image is identified to be the face of the target person. When the identification result is authenticated, the predictive robot 200 knows the name of the family member, which is stored in the basic information of the prediction-related terms.

As described above, when an image is identified to be an arbitrary member of the family who has been registered in the dictionary in advance, a determination is made as to whether or not a family member is in the vicinity of the predictive robot 200.

When the predictive robot 200 finds that the family member is in its vicinity, the hit prediction search result is subjected to media conversion by the media converter 205, and is thereby provided to the family member (step S309). With regard to notification, the category, parameters, and name of the family member of the hit prediction-related term are respectively applied to a template, such as that shown in FIG. 6. In the example shown in FIG. 6, the notification section 206 provides information as follows by voice synthesis: "Mom (name of the family member), (rainfall probability) is (20% or higher). Is the laundry OK?"

When the family member is not in the vicinity of the predictive robot 200 (step S308), a check is made as to whether or not the family member is at home (step S310). Whether or not the family member is at home can be grasped by, for instance, when the target house is an affiliate of the security system, searching whether or not the security is in an absence mode, through a provider of the security system company via the communicator 201. Alternatively, whether or not the family member is at home can be grasped by accessing a home server via the communicator 201 and searching whether or not the security is set in the absence mode in a manner similar to the above. When the family member is at home, the information to be provided to the predictive robot (i.e., information generated by use of the template shown in FIG. 6) is provided on an information device closest to the family member (e.g., on a TV screen in a living room) (step S311). When the security is set to the absence mode, in the case where the prediction notification level is AAA, such as the category of "traffic" (step S312), the information is transferred to a cell phone of the family member via the communicator 201 by way of a service provider, thereby being provided (step S313). In a case where the prediction notification level is AA, an attempt does not need to be made to pursue the family member who is outside the home by providing the member with the predictive information.

Similarly, in the case where the prediction notification level is A (step S307), the predictive information is provided to the predictive robot 200 without checking whether or not the family member is in the vicinity of the predictive robot. In the case where the prediction notification level is other than AAA, AA, or A, when a notification time elapses (step S314), the predictive information is provided to the predictive robot 200 (step 309).

Figure 7:
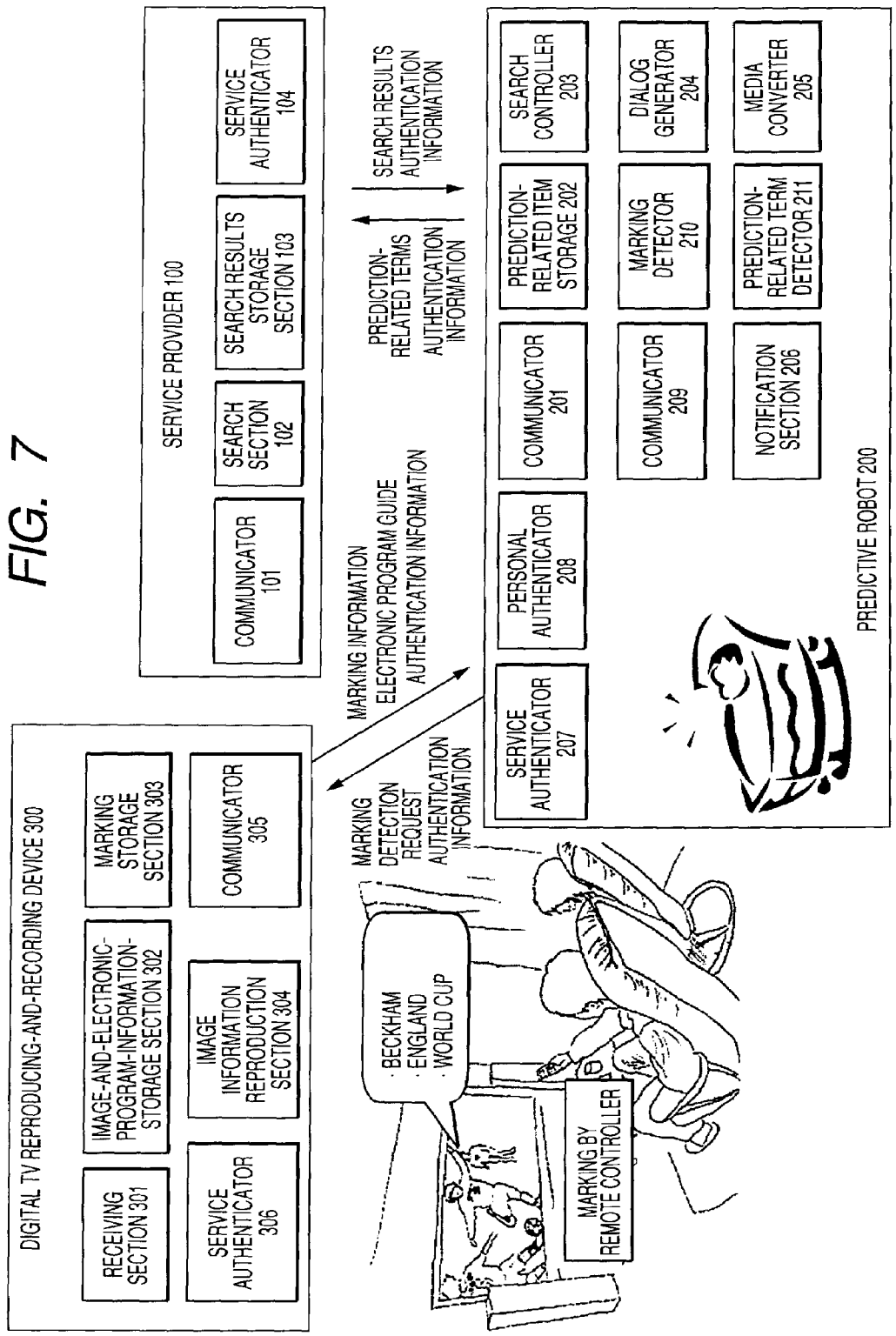
FIG. 7 is a schematic configuration diagram of a mode of a second embodiment of the invention.
Figure 8:
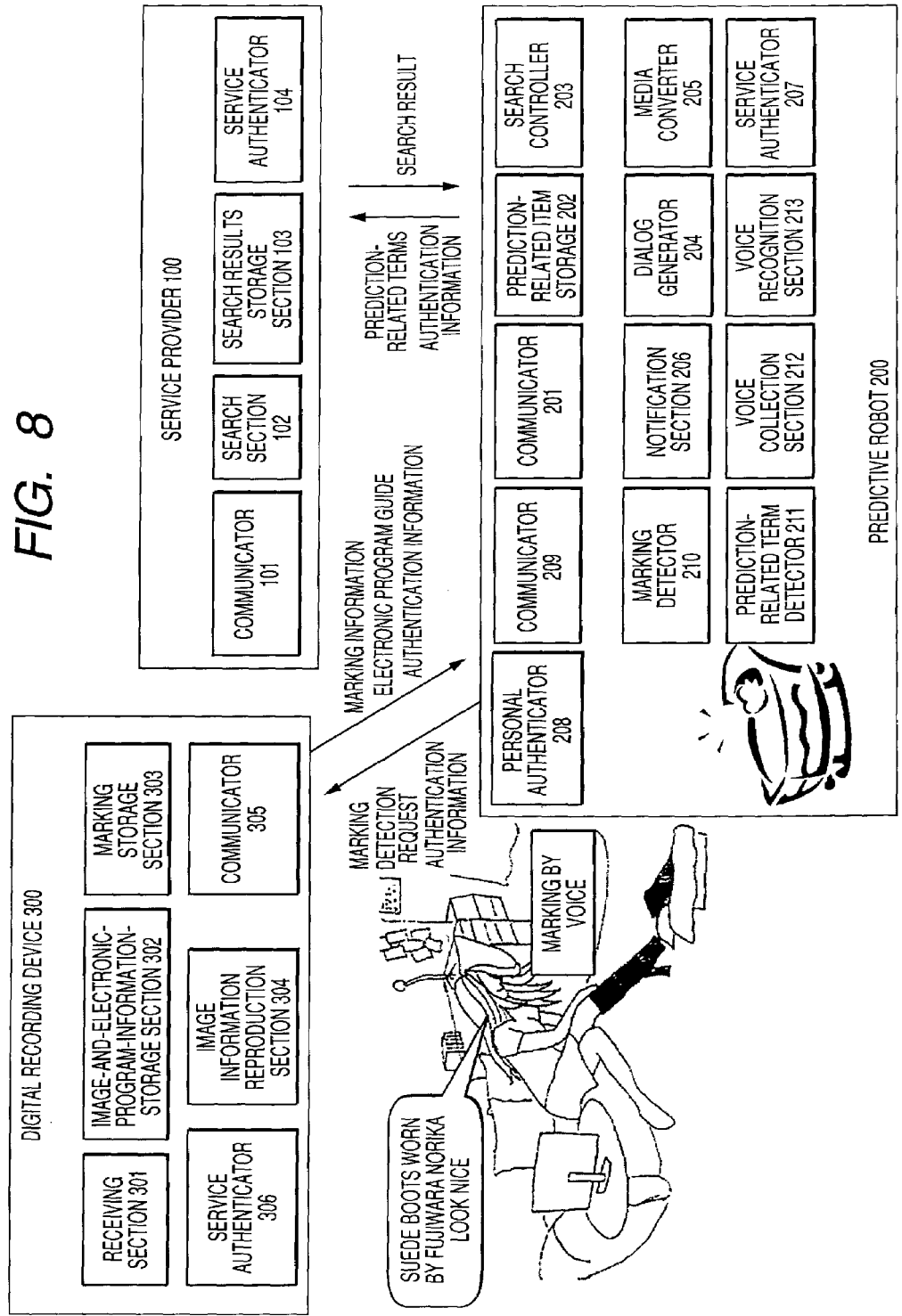
FIG. 8 is a schematic configuration diagram of another mode of the second embodiment of the invention.

In the above-described first embodiment, the prediction-related terms do not change. However, the predictive robot 200 is allowed to extract new prediction-related terms from users' unconscious marking activities when the schematic diagram shown in FIG. 1 is modified to that shown in FIG. 7 or 8. FIGS. 7 and 8 show schematic diagrams of a second embodiment.

In the schematic diagram shown in FIG. 7, a user, who seems to like viewing additional information while watching a TV program or playing back a recorded video, gives an instruction toward a screen by a remote controller. In the case of video playback, a digital TV reproducing-and-recording device 300 separates an electronic program guide from broadcast waves being received, by way of a receiving section 301. On the basis of an electronic program guide stored in advance in an image-and-electronic-program-guide-storage section 302, additional information, such as "• Beckham, • England, • World Cup" can be displayed as illustrated in a speech balloon in the TV screen shown in FIG. 7.

The digital TV reproducing-and-recording device 300 stores, in a marking storage section 303, a time when the user performed marking of additional information notification, an electronic program guide, such as a title of the program under receiving-and-reproducing/reproducing of "sports" or "soccer", and the marked data "• Beckham, • England, • World Cup."

The predictive robot 200 transmits a marking data request on which an authentication code is attached to the digital reproducing-and-recording device 300 from a marking detector 210 via a communicator 209 for conducting communication with in-house information devices, such as Bluetooth™, or a wireless LAN.

In the digital reproducing-and-recording device 300, a service authenticator 306 determines whether the authentication code is correct. Thereafter, the digital reproducing-and-recording device 300 transmits to the predictive robot 200 information stored in the marking storage section 303 with an authentication code attached thereto.

In the predictive robot 200, a prediction-related term detector 211 determines whether or not the thus-received marking data are identical with a prediction-related term which has been already stored in the prediction-related term storage section 202. Data such as "sports, " "soccer," "Beckham (http://xxx)," "England," or "World Cup (http://yyy)" are not stored in, for instance, the table shown in FIG. 2. Accordingly, the prediction-related term detector 211 determines that the term is a new prediction-related term, and additionally stores it in the table shown in FIG. 2.

FIG. 9 shows an example of the result. With regard to Beckham or World Cup, URLs which have been added when the additional information is displayed are stored as parameters thereof. Alternatively, there can be adopted a method such that retrieval with use of a prediction-related term of "Beckham" is performed by way of the service provider before the prediction-related term is stored in the prediction-related term storage section 202, and the thus-retrieved URL is stored as a URL corresponding to "Beckham."

FIG. 7 shows an embodiment where marking is effected by a remote controller, in contrast, FIG. 8 shows an example where marking is effected by voice.

The predictive robot 200 shown in FIG. 8 has, in addition to the constitution shown in FIG. 7, a voice collection section 212 constituted of, e.g., a microphone array, and the like, and a voice recognition section 213 for recognizing voice collected by the voice collection section 212. In FIG. 7, a user performs marking by the remote controller, in contrast, in FIG. 8, the user's monologue or the utterance issued during conversation with other family members while watching TV program or playing back a previously-recorded video is taken as marking.

In the predictive robot 200, when the voice collection section 212 senses a speech, the voice is recognized by the voice recognition section 213. In voice recognition, recognition of proper names—which are included in large number, such as "Fujiwara Norika (name of a Japanese actress) "—is difficult, and such names are classified as unknown words. For instance, in many situations of voice recognition, "Fujiwara Norika" is recognized as "Fujiwara XX ka." That is, "Fujiwara" and the last sound "ka" can be recognized, but the remaining sounds fail to be recognized.

In many situations, the prediction-related term detector 211 cannot determine whether or not the terminology is a proper name in the real world. In such a case, the prediction-related term detector 211 retrieves a term having such fuzziness among vocabularies recognized by the voice recognition section 213 by right truncation. A proper name of the thus-searched term is stored in the prediction-related term storage section 202 as a prediction-related term.

As described above, according to the embodiment, there can be realized a predictive robot for providing predictive information on the basis of new prediction-related terms which have been acquired from a user's unconscious marking activities, such as operation of a remote controller for recording of TV program, or speech.

What is claimed is:

1. A predictive robot comprising:
a prediction-related item storage to store terms related to prediction performance;

a first communicator which transmits stored prediction-related terms and receives a search result of information search with regard to the prediction-related terms;

a search controller to control information search of the prediction-related terms stored in the prediction-related item storage via the first communicator;

a media converter to convert the search result into a notification medium; and a notification section to provide the search result by the notification medium, wherein predictive information is provided spontaneously.

2. The predictive robot according to claim 1, further comprising:

a marking detector to detect marking data which a user has marked by another device, by way of the first communicator; and a prediction-related term detector which compares the marking data with prediction-related terms stored in the prediction-related item storage, thereby detects a new prediction-related term, wherein the new prediction-related term is stored in the prediction-related item storage.

3. The predictive robot according to claim 2, wherein the prediction-related term detector performs retrieval to check whether or not the new prediction-related term exists as a word, by way of the first communicator.

4. The predictive robot according to claim 1, further comprising:

a personal authenticator to authenticate a person, wherein the predictive information is provided to a authenticated person from the notification medium.

5. The predictive robot according to claim 1, further comprising:

a voice collection section to collect a user's voice;

a voice recognition section to recognize the user's voice collected by the voice collection section; and a prediction-related term detector which compares with prediction-related terms stored in the prediction-related item storage, thereby detects a new prediction-related term of vocabularies recognized by the voice recognition section, wherein the prediction-related term is stored in the prediction-related item storage.

6. The predictive robot according to claim 5, wherein the prediction-related term detector performs retrieval to check whether or not the new prediction-related term exists as a word, by way of the first communicator.

7. A predictive robot comprising:

a prediction-related item storage to store terms related to prediction performance;

a first communicator which transmits stored prediction-related terms and receives a search result of information search with regard to the prediction-related terms;

a search controller to control information search of the prediction-related terms stored in the prediction-related item storage via the first communicator;

a dialog generator to generate a predictive content by comparison of the search result with past search results;

a media converter to convert the predictive content into a notification medium; and a notification section to provide the search result by the notification medium, wherein predictive information is provided spontaneously.

8. The predictive robot according to claim 7, further comprising:

a personal authenticator to authenticate a person, wherein the predictive information is provided to a authenticated person from the notification medium.

9. The predictive robot according to claim 7, further comprising:

a marking detector to detect marking data which a user has marked by another device, by way of the first communicator; and a prediction-related term detector which compares the marking data with prediction-related terms stored in the prediction-related item storage, thereby detects a new prediction-related term, wherein the new prediction-related term is stored in the prediction-related item storage.

10. The predictive robot according to claim 9, wherein the prediction-related term detector performs retrieval to check whether or not the new prediction-related term exists as a word, by way of the first communicator.

11. The predictive robot according to claim 7, further comprising:

a voice collection section to collect a user's voice;

a voice recognition section to recognize the user's voice collected by the voice collection section; and a prediction-related term detector which compares with prediction-related terms stored in the prediction-related item storage, thereby detects a new prediction-related term of vocabularies recognized by the voice recognition section, wherein the prediction-related term is stored in the prediction-related item storage.

12. The predictive robot according to claim 11, wherein the prediction-related term detector performs retrieval to check whether or not the new prediction-related term exists as a word, by way of the first communicator.

13. A control method for predictive robot, comprising:

transmitting a prediction-related term from a prediction-related item storage which stores terms related to prediction performance, by way of a first communicator;

receiving a search result of information search of the prediction-related term performed by the first communicator;

controlling information search of the prediction-related term stored in the prediction-related item storage by way of the first communicator;

converting the search result into a notification medium; and providing spontaneously predictive information by the notification medium.

14. A predictive robot system comprising:

a predictive robot which includes:

a prediction-related item storage to store terms related to prediction performance;

a first communicator which transmits stored prediction-related terms and receives a search result of information search with regard to the prediction-related terms;

a search controller to control information search of the prediction-related terms stored in the prediction-related item storage, via the first communicator;

a media converter to convert the search result into a notification medium; and a notification section to provide the search result by the notification medium; and
a service provider which includes:
a search section to perform information retrieval of the prediction-related term;
a search result storage to store a search result retrieved by the search section; and
a second communicator to receive the prediction-related term and transmit the search result of information search with regard to the prediction-related term, wherein predictive information is provided spontaneously.

* * * * *